Aug. 7, 1934.  F. RIEBEL, JR., ET AL  1,969,476
APPLICATOR FOR SURFACING MATERIALS
Filed Jan. 25, 1932   5 Sheets-Sheet 1

Inventors
Frederick Riebel Jr.
Dewey M. Dow
Lawrence M. Henson

By Lynn H. Latta Attorney

WITNESS
Walter L. Ulrich

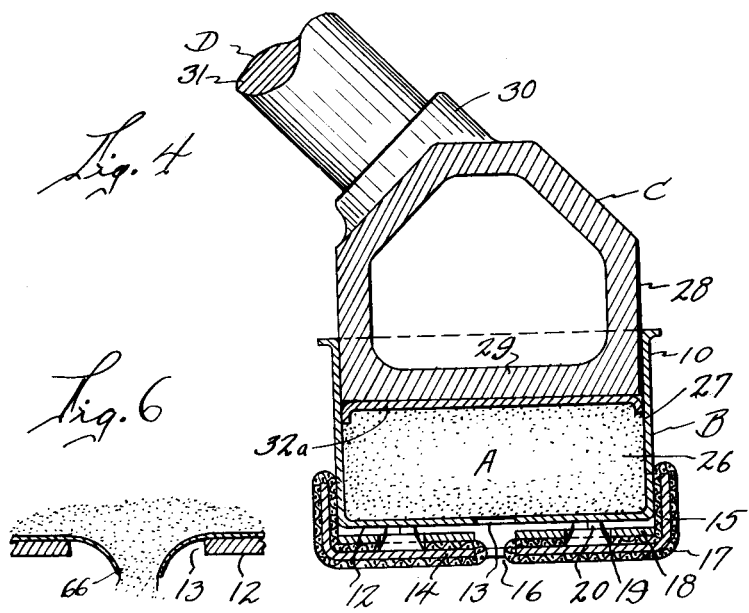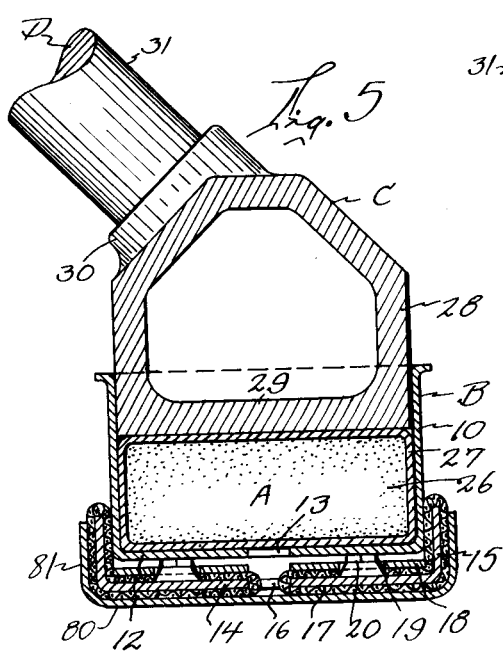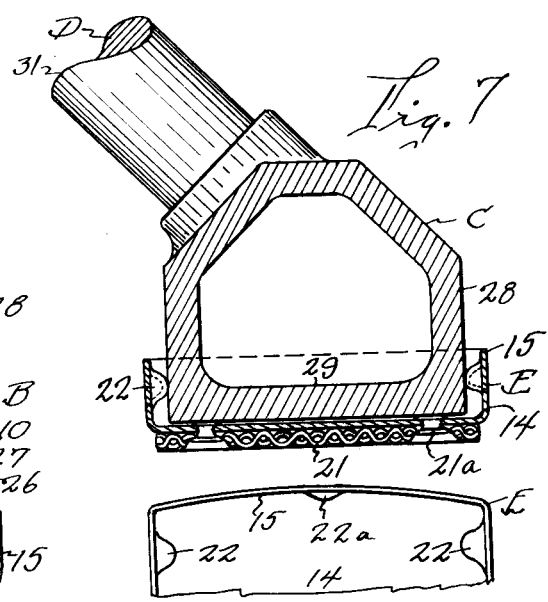

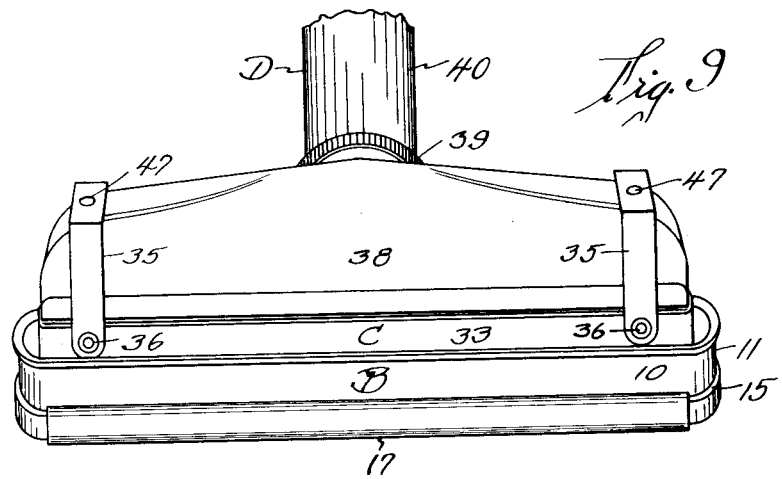
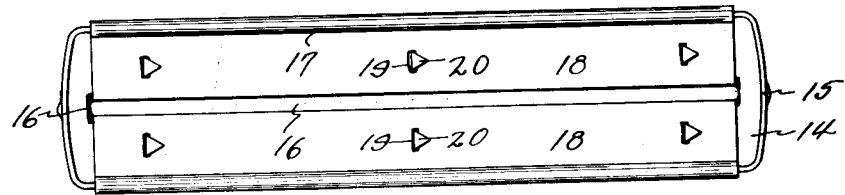
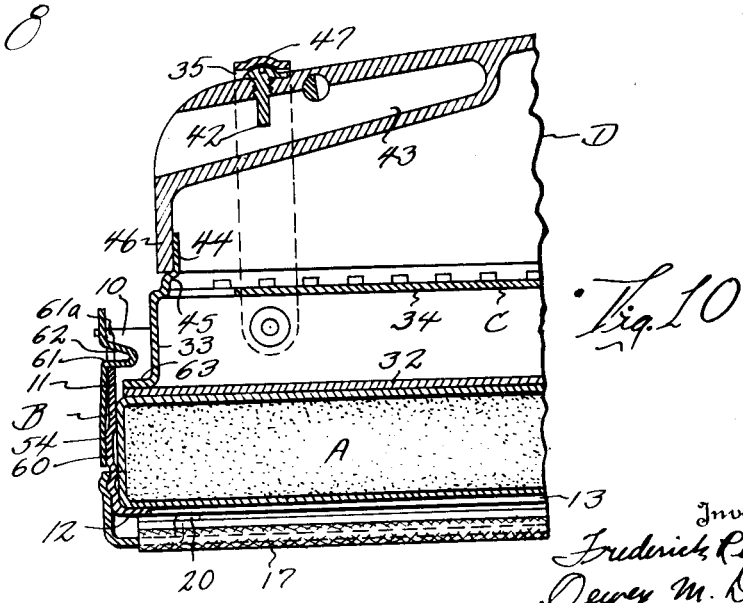

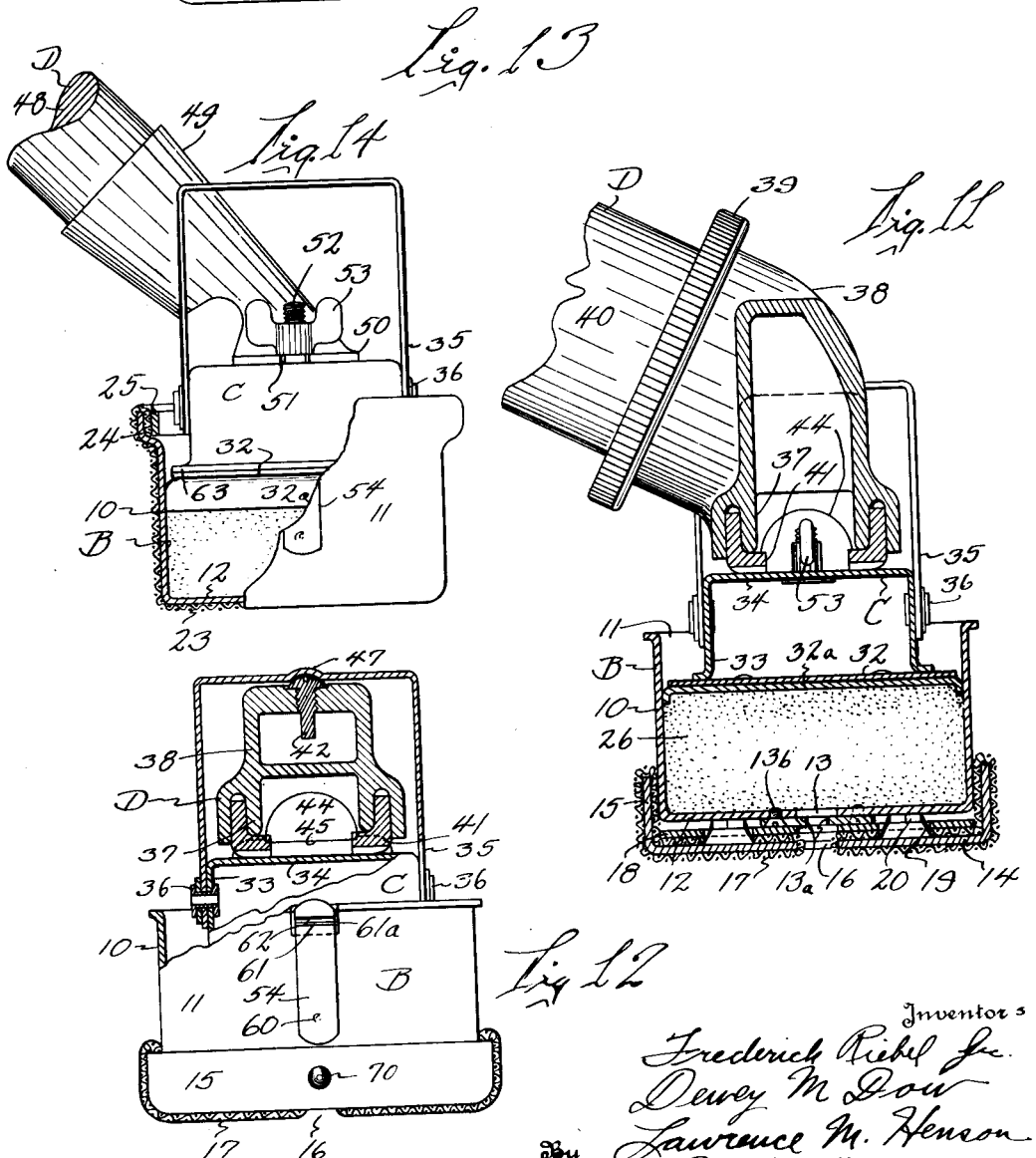

Aug. 7, 1934.  F. RIEBEL, JR., ET AL  1,969,476
APPLICATOR FOR SURFACING MATERIALS
Filed Jan. 25, 1932   5 Sheets-Sheet 5
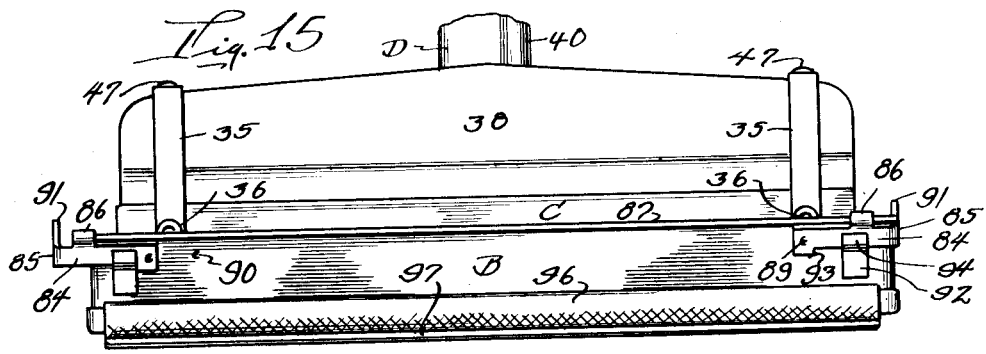
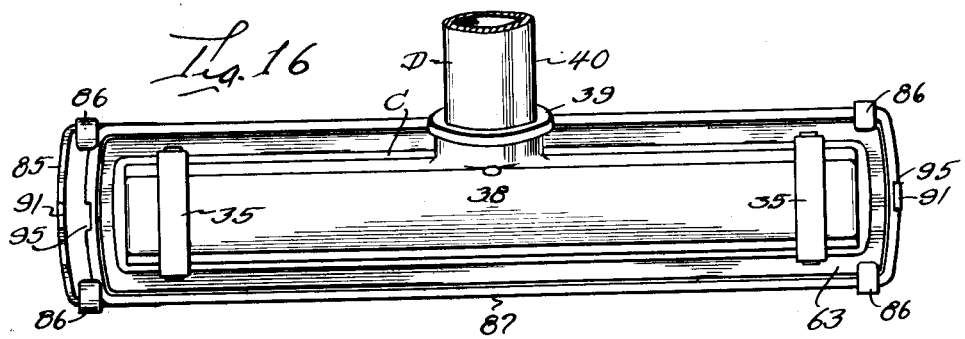
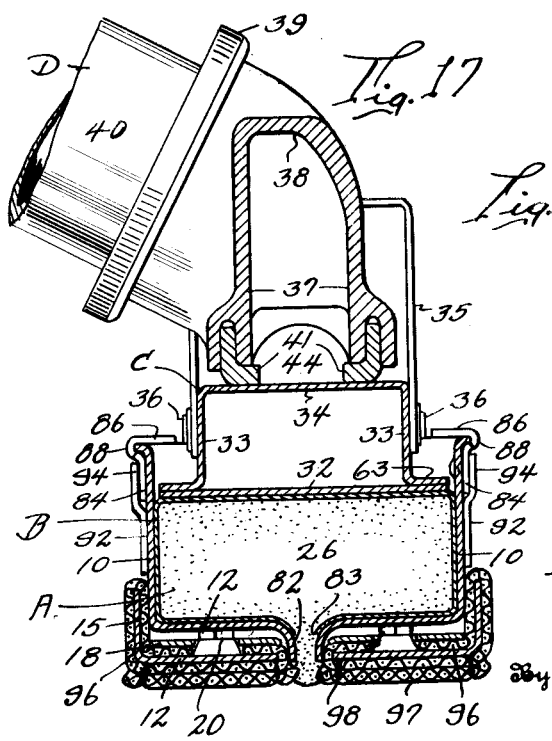
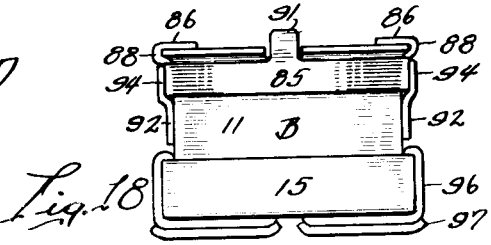
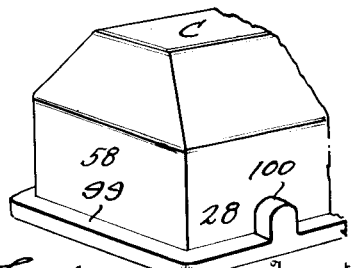
Inventors
Frederick Riebel Jr.
Dewey M. Dow
Lawrence M. Henson
Lynn N. Latta Attorney Patented Aug. 7, 1934

1,969,476

UNITED STATES PATENT OFFICE 1,969,476

APPLICATOR FOR SURFACING MATERIALS

Frederick Riebel, Jr., Dewey M. Dow, and Lawrence M. Henson, Toledo, Ohio, assignors to Air-Way Electric Appliance Corporation, Toledo, Ohio, a corporation of Delaware Application January 25, 1932, Serial No. 588,834

18 Claims. (Cl. 91—39)

Our invention relates to applicators for surfacing materials and has as its primary object to provide an applicator capable of handling wax of the semi-solid, semi-fluid type. Such wax ordinarily comprises a hard carnauba wax made semi-fluid by solution in a suitable solvent which is ordinarily quite volatile so that the wax has the characteristic of drying and hardening.

A basic object of this invention is to provide an applicator which is capable of distributing a very uniform and thin film of wax upon a surface being treated. One of the objections to old methods of applying wax has been the uneven distribution of wax over the floor which makes polishing difficult and does not produce a finished surface of uniform luster.

In achieving the foregoing objects, we provide an applicator which utilizes the normal movement given to it by the operator in moving it over the surface under treatment as a means for applying a substantially continuous and substantially uniform pressure to the wax for the purpose of feeding the wax to the surface being treated in a substantially uniform and continuous flow.

To this end, we provide an applicator comprising two relatively movable members, together forming a receptacle or reservoir for the wax, together cooperating to give pressure to the wax for feeding the same, and one of them serving as a distributor for distributing the wax upon the surface under treatment and having an apertured bottom wall or distributor shoe adapted to contact said surface and through which the wax may flow.

The other member of the applicator, which may be conveniently referred to as a presser head, is carried directly upon the end of a holder or handle which is carried in the hands of the operator. The presser although movable relative to the distributor member, has such a connection with the distributor that movement is transmitted from the hands of the operator to the distributor through the medium of the presser and through the medium of the body of wax which lies between the presser head and the distributor. Thus the downward pressure in the presser head created by the force which is applied to the holder by the operator for moving the applicator over the surface under treatment; together with the counter pressure of the distributor resting against the surface being treated, will provide a substantially continuous and uniform squeezing pressure against the body of wax for feeding the same to the surface.

A further object of our invention is to provide an applicator in which the pressure upon the wax can be modified at the will of the operator so that the substantially uniform normal pressure may be either augmented or diminished. The direct connection of the presser head to the holder enables the operator, by merely increasing the downward pressure against the holder or, on the contrary, lifting upwardly against the holder so as to partially counteract the weight of the presser head, to either increase or decrease the pressure against the wax.

This invention also contemplates the provision of a wax applicator which is adapted to employ a packaged body of wax of the type employing a flexible wrapper which may be collapsed as the wax is fed from the applicator.

A further object of our invention is to solve a serious problem met with in waxers generally, namely, the hardening and caking of the wax and the resulting clogging of delivery channels. This is accomplished by employing the applicator construction wherein the wax in moving from the body of wax within the applicator to the surface being waxed, need travel only the thickness of the distributor head of the applicator, the latter lying between the surface being waxed and the body of wax.

An important feature of our invention in this respect is the employment of a long narrow slot in the distributor head for the purpose of feeding the wax. Our object in this connection is to provide a feeding channel which has a maximum feeding capacity and a maximum distributing radius combined with a minimum perimeter and a minimum area. Maximum distributing radius is, of course, a basic function of a wax applicator, and minimum area gives minimum exposure of the wax to the drying action of the air, while minimum perimeter gives minimum resistance to the passage of the wax during the feeding process.

Another object is to provide a waxer of this type which is adapted to be used not only with an ordinary handle holder but also may be used in connection with the floor tool of a vacuum cleaner, serving as a holder.

A further object is to provide in such a waxer, an arrangement wherein the distributor may be encased for storage purposes, to prevent drying of the wax and to protect against soiling, any articles with which the distributor may come in contact during storage in periods of non-use.

A further object is to provide in the above type of waxer, an arrangement by which a very simple attachment will convert the device into a polisher.

With these and other objects in view our invention consists in the combination and construction and arrangement of the various parts thereof, whereby the objects contemplated are attained, as more fully set forth in the accompanying specifications, pointed out in our claims, and illustrated in the accompanying drawings, in which:

Fig. 4 is a transverse sectional view through the waxer.

Fig. 5 is a similar view showing the employment of a packaged block of wax instead of wax in bulk and illustrating the retainer cap for storage purposes.

Fig. 6 is a detail sectional view of the same taken through the slotted distributor head.

Fig. 7 is a view similar to Fig. 4 showing the polisher substituted for the distributor.

Fig. 7a is a plan view of one end of the polisher head.

Fig. 8 is a plan view of the distributor head.

Fig. 9 is a perspective view of that form of the invention which is attachable to the floor tool of a vacuum cleaner.

Fig. 10 is a longitudinal sectional view therethrough.

Fig. 11 is a transverse sectional view through the same.

Fig. 12 is an end view of the same, parts being sectioned.

Fig. 13 is a plan view of a waxer with modified distributor, and with an individual handle.

Fig. 14 is an end view of the same sectioned.

Fig. 15 is a front elevation of a preferred form of the applicator.

Fig. 16 is a plan view of the same.

Fig. 17 is a transverse sectional view thereof.

Fig. 18 is an end view of the preferred distributor, and

Fig. 19 is a perspective view of one end of the cast presser head in its preferred form.

Figure 1:
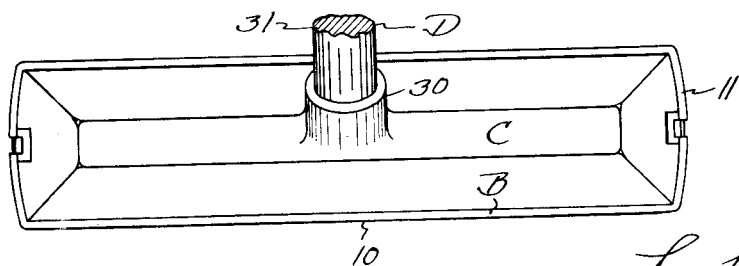
Fig. 1 is a plan view of a waxer embodying our invention.

We have used the reference character "B" to indicate in each form of the invention, the distributor member, similarly, the reference character "C" indicates the presser head which cooperates with the distributor "B" to form the applicator in which the wax 26 is enclosed.

The reference character "D" indicates generally in each form of the invention a holder from which the presser head "C" is suspended.

The distributor "B" is formed with a pan or receptacle having the side walls 10, end walls 11, and bottom wall 12, the latter being perforated at 13 with a slot running longitudinally of the receptacle.

Figure 2:
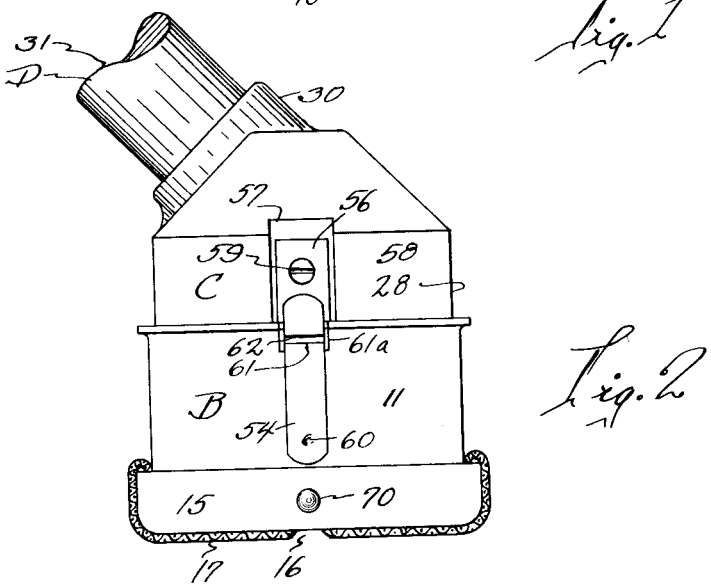
Fig. 2 is an end view of the same.
Figure 3:
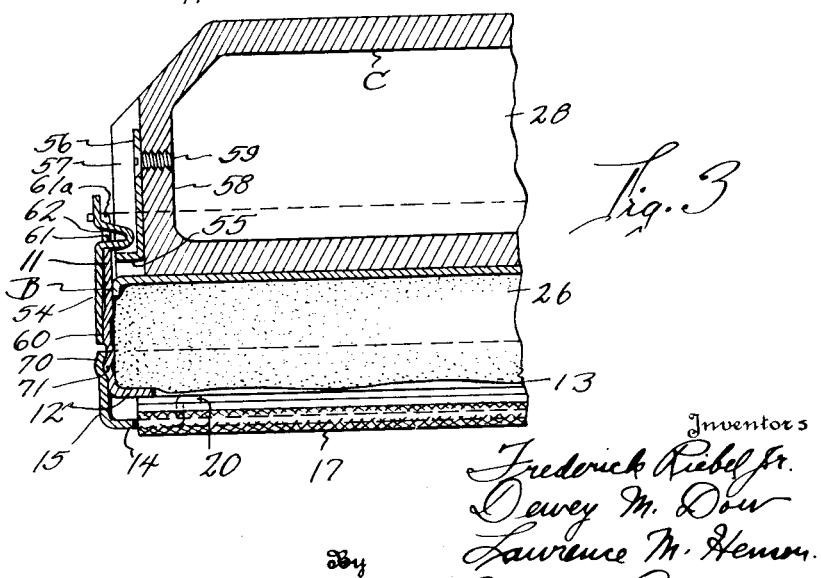
Fig. 3 is a longitudinal sectional view thereof.

The distributor also includes a distributor shoe which in its detachable form shown in Figs. 1 to 12 inclusive, includes a sheet metal shell comprising a plate 14 and a peripheral flange 15 to receive the distributor receptacle and a central longitudinal slot 16 to register with the slot 13.

A sheet of fabric 17, having a length somewhat less than the length of the slot 16, is extended around each half of the distributor shoe shell, and secured between an anchor plate 18 and the inner shell plate 14. The anchor plate 18 is perforated with a series of slots 19 through which are extended tongues 20 struck upwardly from the shell plate 14.

The tongues 20 are bent over to secure the anchor plate 18 in clamping engagement with the extremities of the distributor fabric 17. It will be noted that the edge of the anchor plate snugly holds the fabric in the corner between the plate 14 and flange 15 of the shell, and the fabric will be pulled tightly around the shell by the anchor plate as it is clamped down against the inner face of the shell. The anchor plate also serves to cover and conceal both edges of the fabric.

The distributor shoe slips over the bottom portion of the distributor receptacle, the flange 15 being of the proper dimensions to receive the receptacle.

The end portions of the flange 15 (Fig. 2) are provided with depressions 70 which receive lugs 71 pressed into the end walls 11 of the distributor receptacle. There is sufficient resiliency in the flange 15 to allow the flange to snap over these lugs, and the latter serve to securely support the distributor head on the distributor receptacle.

The distributor may be substituted for by a polishing shoe "E" shown in Fig. 7. The polishing shoe "E", in order to cut down the number of parts necessary for manufacturing a complete set of apparatus, is preferably constructed so as to utilize the same shell 14—15 which is employed for the distributor shoe, the side walls of the shell being provided with pressed out lugs 22 to center the polishing shoe on the presser head "C" as shown in Fig. 7, and lugs 22a to engage above the hooks 55.

A sheet 21 of polishing felt or the like material is secured by rivets 21a to the bottom plate 14 of the polisher shoe "E". A brush or sheet of cotton or canvas may also be employed for this purpose.

In Fig. 14 we have shown a modified form of the distributor in which the distributing shoe is formed by the bottom wall 12 of the receptacle and a sheet of fabric 23 extended around both sides and ends of the receptacle and clamped within the peripheral shouldered flange 24 by means of a clamping ring 25. The wall 12 has the same slot 13 as is shown in Fig. 4, and the fabric 23 is provided with a slot (not shown) to register with a slot in the bottom wall 12.

The wax package "A" comprises a block of wax 26 shaped to fit the horizontal cross sectional shape of the receptacle, preferably flat on its upper and lower faces so as to have uniform thickness in all directions horizontally, and encased in a wrapper of thin tough material 27 such as the product commercially known as "Cellophane".

The presser head "C" in that form of the invention shown in Figs. 1 to 7 inclusive, comprises a hollow block of cast metal having the side walls 28 and bottom wall 29, the side walls 28 being shaped to fit snugly within the side walls 10 of the distributor receptacle and the bottom wall 29 being shaped to fit the upper surface of the wax package "A". An interiorly threaded boss 30 receives an ordinary wooden handle 31 which serves as the holder for the applicator.

The packing member 32a is secured to the lower face of the presser head "C", and serves to prevent the wax 26 from exuding upwardly around the presser head when pressure is applied to the wax.

In that form of the invention shown in Figs. 8 to 14 inclusive, the head is formed of stamped sheet metal, having little weight in itself and relying upon the weight of the holder "D" or the pressure applied thereto for giving pressure to the wax package. This form of the head has a back plate 32 to which is welded an inverted cup shaped saddle having side flanges 33 and top wall 34.

Yokes 35 are swingingly pivoted by suitable rivets or the like 36 to the flanges 33 near the respective ends of the head.

The particular type of vacuum cleaner floor tool to which this head is adapted to be attached is one having a hollow mouth defined between lips 37 in a nozzle 38 which is swivelled at 39 upon a suction neck 40. Agitator members 41 are mounted in the lips 37.

Referring now to Fig. 9, it is to be noted that the suction nozzle 38 projects laterally on either side of the neck 40, and that the yokes 35 are arranged to be swung from substantially horizontal positions, around the ends of the floor tool nozzle, to substantially upstanding positions engaging the semispherical heads of screws 42 mounted in the ends of the floor tool.

The screw 42 is an element which is found in this particular type of floor tool, serving to retain within the socket 43 (Fig. 10) a floor tool wheel mounting which is removed when the vacuum cleaner is employed as a holder for the waxer of this invention.

The top wall 34 of the head is provided with upstruck portions each including a tongue 44 receivable between the lips 37 of the nozzle mouth and the wider shoulder portions 45 against which the end walls 46 of the floor tool nozzle are seated. The agitators 41 will contact the wall 34 of the head when the nozzle is seated against the shoulders 45, and the yokes 35 are adapted to spring into place to snugly hold the parts in this relation.

In order to prevent the yokes slipping from the heads of the screws 42, they are provided with indentations 47 to receive the spherical screw heads.

The type of head which has just been discussed may also be employed with an ordinary wooden handle 48, provided with a ferrule 49 terminating in a claw 50 the ends of which are slotted as at 51 (Fig. 14) to receive studs 52 mounted in the top wall 34 of the shoe. Wing nuts 53 serve to secure the claw 50 against the top wall 34 of the head.

Referring now to Fig. 11 it is to be noted that the studs 52 and their wing nuts 53 are arranged so that when the head is adapted to the floor tool, they will be received between the lips 37.

Means are provided for attaching the head to the distributor receptacle in such a manner that while the head is allowed to move freely into the receptacle, it will be retained against disengagement from the receptacle. This means comprises a spring latch member 54 which in that form of the invention employing the cast metal head of Figs. 1 to 6 inclusive, engages with a hook 55 on a keeper member 56 secured by means of a screw 59 in a slot 57 extending vertically in the end wall 58 of the shoe.

The latch 54 is secured to the end wall 11 of the distributor receptacle as by welding at 60, and is provided near its upper end with a detent 61 provided with an inclined portion 62 against which the keeper hook 55 may ride when the head is being inserted into the distributor receptacle, in order to force the latch outwardly and to allow the keeper hook to pass the detent. The detent 61 extends through a slot 61a in the end wall 11.

In that form of the invention shown in Figs. 7 to 13 inclusive, the projecting out-turned edge portion 63 of the head flange 33, by means of which the upper portion of the head is welded to the back plate 32, serves to engage the detent 61, thus having the function of the keeper hook 55.

It is to be noted that the head may move freely below the detents 61 but will engage the detents if moved upwardly, so as to carry the distributor receptacle in depending relation to itself.

In using packaged wax, after the parts have been assembled with a package of wax enclosed within the distributor, and the distributor shoe in place, a sharp instrument may be inserted through the slots 13—16 and the lower wall of the wrapper 27 pierced to provide a slit registering with the slot 14.

In using the applicator, it is placed upon the floor or surface to be waxed, with the flat lower faces of the fabric 14 in contact with such surface, the weight of the head "C" thence serving to urge the wax 26 through the slots 13—16 upon the surface being treated. As the applicator is moved back and forth over the surface, the wax will gradually work its way to the surface as just described, and will thence be distributed over the surface by the fabric face of the distributor head.

It is to be noted that the wax after passing through the slot 16 will be engaged by the entire width of one side or the other of the distributor shoe, depending on which way the applicator is being moved, before it is finally left in a thin film on the surface of the floor.

The wax has to travel but a very short distance from the dispensing package to the surface to be treated and thus the tendency of the wax to dry out and cake in the feeding mouth of the applicator is minimized.

The distributor shoe has a rigid shape which is flat, to conform at all times with a flat floor surface and thus there is assured a contact between the entire face of the distributor and the surface being waxed.

There is just sufficient play between the shoe "C" and the receptacle of the distributor "B" to create a rocking movement of the presser head as the waxer is moved back and forth, causing a better feeding of the wax.

Under the substantially uniform pressure of the applicator produced by the ordinary operation of the device, there will be a very slow but continuous and uniform flow of wax through the mouth of the distributor shoe and onto the surface being waxed. This uniform flow of wax must necessarily result in a uniform distribution of wax to the surface being treated. Furthermore, since the wax is applied with a continuous feeding of the wax, it is possible to apply it in a much thinner film than is ordinarily produced in those devices which do not produce a steady flow of wax.

As a result of the application of the wax in a thinner film, it is much easier to polish the surface after the wax has been applied. It is common knowledge that a thick film of polishing material is much more difficult to reduce to a hard, glazed coating than a thin film of material.

As a further consequence of the ability to apply the wax in a thinner film than heretofore, a considerable saving in wax is effected.

The uniformity of flow results from the interposing of the wax between the distributor portion and presser head portion of the applicator whereby the downward pressure of the head is transmitted to the distributor through the medium of the wax and, the wax being thus subjected to the downward pressure of the head, is compressed slightly so as to feed it gradually and uniformly to the surface being treated.

The slot 13 may be adjusted in width by the lips 13a, adjustably secured by screws 13b in contact with the lower faces of the bottom wall 12, and bordering the slot 13. The slot 13 being a continuous one, extending from one end of the applicator to the other, the wax will feed freely enough to secure the desired feeding movement. The radius of distribution is determined by the length of the slot. The body of wax in feeding to the slot 13, is allowed to move bodily in a gradual flow toward the axial center of the mass. It has been found that other types of openings, for instance, a series of small openings, offer too much resistance to the flow of wax.

The intrinsic weight of the holder-presser head combination is sufficient to produce a certain amount of feeding pressure against the wax, which may be augmented or diminished by the operator in manipulation of the holder. For instance, by pressing down on the holder, the pressure may be increased, while by lifting upwardly on the holder, the pressure may be diminished. Where a shaft handle is employed as a holder, this intrinsic weight lies mostly in the presser head of cast metal, but in the arrangement with a suction cleaner, the latter provides most of the weight and the presser head is accordingly made of light material.

The storage cap 80 shown in Fig. 5, comprises simply a sheet metal shell with flanges 81 to receive the distributor shoe. The cap will close the slot 16 against the admission of air, serve to prevent drying of the wax, and prevent the applicator soiling articles with which it may come in contact.

In the preferred form of the invention shown in Figs. 15 to 18, inclusive, the feed slot in the bottom of the distributor receptacle is defined between the two downwardly projecting, spaced lips 82 which close the space between the bottom wall 12 and the distributor head to prevent wax working into said space. These lips also aid very materially in the feeding of the wax, providing two smooth surfaces against which the wax may slide. The resistance to flow is thus very materially decreased. The lower extremities of the lips 82 engage the fabric edges of the mouth 16, thus providing a seal.

The lips 82 are formed by slitting the bottom wall 12 and pressing the portions bordering the slit downwardly. The shoulders formed between the lips and the bottom are curved rather broadly as at 83 to provide a flaring mouth offering minimum resistance to the flow of wax thereinto.

The preferred latching means for suspending the distributor from the presser shoe, is a yoke shaped sliding latch attached to each end of the distributor receptacle. The latch includes a pair of side arms 84 connected by a bail 85, and each provided with a bolt 86 which slides against the upper face of the flange 87 on the side wall 10 of the receptacle, while the arms 84 embrace and slide against the vertical faces of said side walls 10.

In its extended or open position shown at the left hand side of each of Figs. 15 and 16, the latch is held against disengagement from the distributor receptacle by means of the bracket 92 secured to the side wall 10 of the receptacle and the hook 93 which is formed on the end of each arm 84 and projects downwardly to engage the bracket 92.

The bracket 92 has a portion 94 spaced from the side wall 10 and forming therewith a channel in which the arm 84 may slide. The bracket 92 serves to prevent downward movement of the inner end of the arm 84.

The upper edges of the arms 84 engage against the lower face of the flange 87, and the bolts 86 are hooked around the flanges 87 as at 88. Thus the latch is securely held against tipping movement either upwardly or downwardly while sliding movement of the latch in a horizontal plane is allowed.

The arms 84 are provided near their ends with punched lugs 89 which spring into the corresponding punched depressions 90 in the side wall 10 of the distributor receptacle when the latch is in closed or operative position. Thus the latch is held in its operative position and can be displaced therefrom only by considerable pull upon the handle 91 of the bail 85.

A notch 95 is provided in the flange 87 to receive the handle 91 so that the bail 85 may rest snugly against the end wall of the distributor receptacle when the latch is in closed position.

The arrangement is such that when the latch is in closed position, the bolts 86 will project over the flange 63 of the presser head "C", and when the latch is in its extended or open position, the bolts 86, while still engaging the flange 87 of the distributor receptacle, will be retracted to positions where the presser head "C" may be lifted out of the receptacle and a package of wax inserted into the receptacle.

In the preferred form of the invention, the distributor shoe covering includes a backing sheet 96 of canvas or heavy ducking, and a felt facing 97 sewed as at 98 to the backing sheet 96.

The cast presser head is preferably formed as shown in Fig. 19, with an integrally cast flange 99 extending around its lower edge, and integrally cast buttress lugs 100 positioned to engage the pressed out lugs 22 of the polisher shoe "E" when the latter is in use. (See Fig. 19.) The flange 99 at its ends, replaces the hooks 55.

We claim as our invention:

1. In an applicator for semi-fluid surfacing material, a distributor including a peripheral wall, a bottom member or shoe provided with a peripheral flange receiving the lower portion of said wall, said shoe having a central longitudinal aperture, a pair of fabric pads secured around the respective halves of the shoe separated by said aperture, and anchor plates securing the ends of the respective pads against the upper faces of the shoe.

2. In an applicator for plastic surfacing material, a receptacle including opposed side walls end portions of which are provided with parallel out turned flanges, a presser head received in said receptacle, and a slidable latch device including portions slidably embracing said flanges and including a member projecting, when in operative position, over a portion of said presser head, to prevent withdrawal of the head from the receptacle.

3. In an applicator for plastic surfacing material, a receptacle including opposed side walls end portions of which are provided with parallel out turned flanges, a presser head received in said receptacle, and a slidable latch device including portions slidably embracing said flanges and projecting over side portions of said head to prevent withdrawal thereof from the receptacle.

4. In an applicator for plastic surfacing material, an elongated receptacle, a presser head received in said receptacle, a yoke shaped latch device embracing an end portion of said receptacle, said latch device including a member normally projecting over a portion of said presser head to prevent withdrawal thereof from the receptacle, and means connecting said yoke to the receptacle for sliding movement longitudinally of the receptacle, to retract said member to an inoperative position.

5. In an applicator for plastic surfacing material, an elongated receptacle, a presser head received in said receptacle, a yoke shaped latch device embracing an end portion of said receptacle, said latch device including a member normally projecting over a portion of said presser head to prevent withdrawal thereof from the receptacle, means connecting said yoke to the receptacle for sliding movement longitudinally of the receptacle, to retract said member to an inoperative position, and a handle on said yoke, intermediate the arms thereof, projecting above the receptacle.

6. In an applicator for plastic surfacing material, an elongated receptacle, a presser head received in said receptacle, a yoke shaped latch device embracing an end portion of said receptacle, the arms of said yoke having members projecting toward each other over corner portions of the head of said presser head to prevent withdrawal thereof from the receptacle, and means connecting said yoke to the receptacle for sliding movement longitudinally of the receptacle, to retract said member to an inoperative position.

7. In an applicator for plastic surfacing material, a receptacle provided in its working side with a feed slot defined between out turned lips, and a distributor shoe detachably mounted on said working side and provided with a mouth registering with said slot, and fabric members extended beneath the respective halves of the shoe separated by said mouth, and through said mouth, said lips contacting said fabric members at the edges of said mouth.

8. In an applicator for semi-fluid surfacing material, a receptacle-like apertured distributor adapted to contain a body of such material, a presser head comprising a flat back plate and a downwardly cupped saddle of sheet metal the edge of which is turned outwardly to form a marginal flange secured to said plate, retractible means on the distributor extending over said flange, and a holder on which said presser head is rigidly carried.

9. In an applicator for semi-fluid surfacing material, a distributor including a peripheral receptacle wall provided in its end portion with opposed indented portions, and a detachable distributor shoe having a peripheral flange receiving said receptacle wall and provided in its end portions with indentations adapted to spring into position coacting with the aforesaid indentations to secure the shoe to the receptacle wall, said shoe having a feed slot extending substantially from end to end thereof, and fabric pads wrapped around and secured to the respective halves of the shoe separated by said slot, and serving as packing elements interposed between the side flanges of the shoe and receptacle, and as means for distributing the material extruded through said slot.

10. In an applicator for semi-fluid surfacing material, a distributor including a peripheral receptacle wall, a bottom member or shoe through which the material is extruded, detachably secured thereto, said shoe having a central longitudinal aperture, and a pair of fabric pads wrapped laterally around and secured to the respective halves of the shoe separated by said aperture so as to form two separated surface engaging portions merging into upwardly curved portions extending through said aperture.

11. In an applicator for plastic surfacing material, a distributor including a peripheral receptacle wall, a shoe detachably secured to said wall, to form a bottom therefor, said shoe comprising a sheet metal member provided with a longitudinal aperture and a pair of fabric elements wrapped laterally around the respective halves of said member separated by said aperture and extending through said aperture, and secured to the upper sides thereof, and distributing pads secured to the bottom portions of said elements and defining between them an elongated distributing mouth.

12. In an applicator for plastic surfacing wax or the like, a receptacle provided in its working side with a feed slot defined between out turned lips, a distributor shoe detachably mounted on said working side and provided with a mouth registering with said slot and directly communicating with said lips.

13. In an applicator for plastic surfacing material, a receptacle provided in its working side with a feed slot defined between out turned lips, and a distributor shoe detachably mounted on said working side and provided with a mouth registering with said slot and communicating with said lips, a surfacing material filled collapsible container mounted in said receptacle, and slitted intermediate said lips to form edge portions pressed outwardly against said lips by the extrusion of said material from the container, and means to apply pressure to the opposite side of the container so as to cause said material to be extruded through said slot and through said mouth, the lips serving to carry the material to said mouth without allowing it to spread between the shoe and the receptacle.

14. In an applicator for plastic surfacing material, a distributor comprising an elongated open top receptacle provided near its respective ends with pairs of opposed elements projecting toward each other from the side edges thereof over the receptacle, and a presser head freely received in the receptacle below said elements and normally spaced therebelow in operation of the device, said head being adapted to engage against the top of a body of surfacing material contained in the receptacle and being capable of rocking movement relative to the container, and means for engagement by a hand of an operator, connected to said presser so as to positively transmit rocking movement thereto in response to back and forth movement of the applicator over a surface being treated, transmitted by said means.

15. In an applicator for plastic surfacing materials, a distributor comprising an elongated open top receptacle provided near its respective ends with pairs of opposed elements projecting toward each other from the side edges thereof over the receptacle, and a presser head freely received in the receptacle below said elements and normally spaced therebelow in operation of the device, said elements being retractible to allow removal of the head from the receptacle, said head being adapted to engage against the top of a body of surfacing material contained in the receptacle and being capable of rocking movement relative to the container, and means for engagement by a hand of an operator, connected to said presser so as to positively transmit rocking movement thereto in response to back and forth movement of the applicator over a surface being treated, transmitted thereto by said means.

16. In an applicator for plastic surfacing materials, a distributor comprising an elongated open top receptacle provided near its respective ends with pairs of opposed elements projecting toward each other from the side edges thereof over the receptacle, and a presser head freely received in the receptacle below said elements and normally spaced therebelow in operation of the device, said head being adapted to engage against the top of a body of surfacing material contained in the receptacle and being capable of rocking movement relative to the receptacle, and a holder on which said head is rigidly carried whereby movement of the applicator back and forth over a surface under treatment, transmitted through said handle, together with the frictional resistance of the applicator against said surface will cause the head to rock in the receptacle.

17. In an applicator for plastic surfacing materials, a distributor comprising an elongated open top receptacle provided near its respective ends with pairs of opposed elements projecting toward each other from the side edges thereof over the receptacle, and a presser head mounted in the receptacle below said elements and normally spaced therebelow in operation of the device, said elements being retractible to allow removal of the head from the receptacle, said head being adapted to engage against the top of a body of surfacing material contained in the receptacle and being capable of rocking movement relative to the container, and means for engagement by a hand of an operator, connected to said presser so as to positively transmit rocking movement thereto in response to back and forth movement of the applicator over a surface being treated, transmitted thereto by said means, the bottom of the receptacle being apertured for feeding of the material and provided with a working face that is narrow in the direction of movement in operation.

18. In an applicator for plastic wax or the like, an elongated receptacle having in its bottom wall a feeding mouth that is relatively narrow and extends substantially from end to end of the receptacle, transversely to the direction of movement thereof, a wax containing container of relatively thin, liquid impervious material received in and supported by the walls of said receptacle, and a presser head received in and closing the upper region of the receptacle, said head including a hand engaging member and serving to transmit back and forth movement thereto for moving the applicator over a surface to be treated, and to apply pressure to the top of the container for extruding its contained wax, the bottom wall of the container being slit when the device is in use, intermediate the side edges of the aforesaid mouth, to form two flap portions which will be bent downwardly by the extruding wax through said mouth and thereby sealed against the edges thereof so as to avoid entrance into the spaces between said bottom wall of the container and the bottom wall of the receptacle.

FREDERICK RIEBEL, Jr.
LAWRENCE M. HENSON.
DEWEY M. DOW.